United States Patent
Pelanek

Patent Number: 6,067,075
Date of Patent: *May 23, 2000

[54] CONTROLLER FOR MEDICAL IMAGE REVIEW STATION

[75] Inventor: Geraldine Ann Pelanek, Webster, N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/576,426

[22] Filed: Dec. 21, 1995

[51] Int. Cl.⁷ .................................................. G09G 5/08
[52] U.S. Cl. ........................ 345/158; 345/127; 345/156; 348/384; 348/390; 348/734; 386/70; 386/80; 386/82; 386/125
[58] Field of Search ...................... 345/158, 184, 345/123, 127, 156; 348/578, 734, 384, 390; 386/125, 126, 68, 69, 70, 81, 82, 45, 80; 340/815.47, 815.45

[56] References Cited

U.S. PATENT DOCUMENTS

| | | | |
|---|---|---|---|
| 4,383,276 | 5/1983 | Makino | 386/82 |
| 4,951,036 | 8/1990 | Grueter et al. | 345/184 |
| 4,964,004 | 10/1990 | Barker | 345/156 |
| 5,001,570 | 3/1991 | Tagawa | 386/70 |
| 5,005,084 | 4/1991 | Skinner | 348/734 |
| 5,123,056 | 6/1992 | Wilson | 382/6 |
| 5,173,784 | 12/1992 | Ootsuka et al. | 386/125 |
| 5,187,630 | 2/1993 | Mackay et al. | 386/80 |
| 5,272,760 | 12/1993 | Echerer et al. | 382/6 |
| 5,289,168 | 2/1994 | Freeman | 345/127 |
| 5,302,968 | 4/1994 | Heberle | 345/158 |
| 5,363,139 | 11/1994 | Keith | 348/390 |
| 5,440,401 | 8/1995 | Parulski et al. | 358/342 |
| 5,475,835 | 12/1995 | Hickey | 348/734 |
| 5,479,210 | 12/1995 | Cawley et al. | 348/390 |
| 5,515,044 | 5/1996 | Glatt | 345/156 |
| 5,526,023 | 6/1996 | Sugimoto et al. | 345/156 |
| 5,617,142 | 4/1997 | Hamilton | 348/384 |
| 5,621,484 | 4/1997 | Cotty | 348/734 |
| 5,786,811 | 7/1998 | Jaeger | 345/184 |

FOREIGN PATENT DOCUMENTS 0 669 587 A2  2/1995  European Pat. Off. ........ G06F 17/60

OTHER PUBLICATIONS

Gregory K. Wallace, "The JPEG Still Picture Compression Standard," Communication of the ACM, Apr. 1991, vol. 4, No. 4, pp. 30–44.

*Primary Examiner*—Jeffery A. Hofsass
*Assistant Examiner*—John Tweel
*Attorney, Agent, or Firm*—William F. Noval

[57] ABSTRACT

A medical image review station has several functions with visual feedback which are controlled by a controller. These functions include detail/real-time mode; density, contrast and edge enhancement image appearance characteristics; zoom; cine loop; single frame jog; skip forward/back; displayed frame speed and direction; still print; cancel; directory.

12 Claims, 3 Drawing Sheets

CONTROLLER FOR MEDICAL IMAGE REVIEW STATION

FIELD OF THE INVENTION

This invention relates in general to a medical image review station and more particularly relates to a controller for a medical image review station which facilitates control of the review station with visual feedback.

BACKGROUND OF THE INVENTION

In traditional film screen radiography, an x-ray image of an object, such as an anatomical part of a patient, is formed in film. The film is then processed to produce a developed x-ray film image. Storage of and/or display of multiple x-ray film images from a patient study is space intensive, inconvenient and expensive. With the advent of digital image diagnostic scanner equipment, such as CT and MRI scanners, digital radiographic images have become commonplace. Digital images have several advantages over film images. They can be stored in compact magnetic or optical media. They can be displayed on a display device, such as a video monitor. They can also be processed to optimize various characteristics of the digital radiographic image. Digital radiographic images can also be produced by means of computed radiography techniques.

The most common method today to record cardiac catheterization images are in analog form on specialized 35 mm black and white cine film. The film is then processed and displayed using a film projector. However, there is a strong desire to archive the digitally generated images on a cost effective medium as the official record of the procedure and for future review as well. To use digital storage media more efficiently, the data can be mathematically compressed in a way that is totally reversible (lossless compression). To subsequently view the images, the clinician needs to see the images in real time motion and at slower speeds as well. The clinician also wants to randomly access rather than just sequentially access the images.

It would be desirable to archive a sequence of medical images, such as a cine cardiac catheterization study, in both lossy compressed and losslessly compressed formats on a recordable optical compact disc (CDR). The CD is easily transportable and can be reviewed on a medical image review station. It is desirable that such a review station be operable with a controller and that such a controller have control over several or all of the following functions with visual feedback: view images in real time motion or full resolution images at slower speeds; view such images selectively at variable forward and reverse image frame rates; view selected images one at a time in a selected sequence; view images as a cine loop; adjust the appearance of the displayed image for image characteristics such as edge enhancement, contrast and density; enlarge a portion of a displayed image; print a still frame.

SUMMARY OF THE INVENTION

According to the present invention, there is provided a solution to the problems and needs enumerated above. According to an aspect of the present invention, there is provided in a medical image review station which includes a display, a means for storing a sequence of medical images, and a computer for controlling the processing and display of images from said memory on said display according to user selectable functions, apparatus comprising;
 a controller coupled to said review station including the following user actuatable controls:
  at least a first variable appearance control for controlling a first appearance characteristic of a displayed image;
  a first visual indicator associated with said first appearance control for indicating the relative value of the selected image appearance characteristic; and
  a rotary control for controlling the speed and direction of movement of images displayed on said display.

According to another feature of the present invention, the control includes other control means for controlling other image functions and utilizing image feedback.

The invention is advantageous in making the medical image review station easier to use, particularly for users who are not computer literate. The use of computer screens and other non-intuitive methods for operating the review station are minimized. The controller of the invention uses visual feedback to make the operation of the review station to be intuitively obvious for those who have used non-electronic film based systems.

DESCRIPTION OF THE PREFERRED EMBODIMENTS

Figure 1:
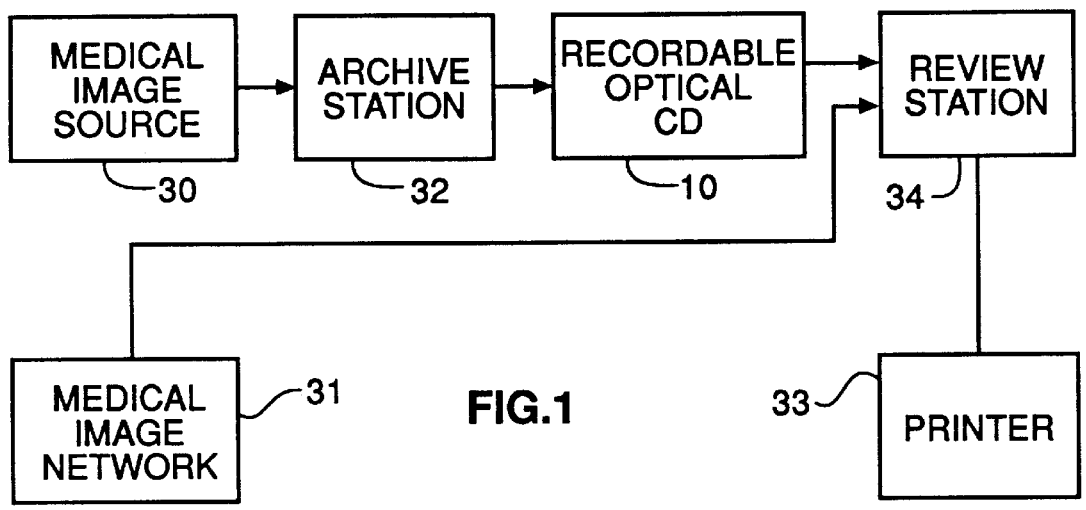
FIG. 1 is a block diagram of a medical image storage system.

The present invention will be described as used in a medical imaging system. Although a cardiology imaging system will be described hereinafter, it will be understood that other medical imaging archiving and review system applications are contemplated for use with the present invention. As shown in FIG. 1, a cardiology motion (cardiac catheterization) image source 30 provides digital images to an archive station 32 where the images are recorded on one or more recordable optical compact disks 10. The recordable optical CD 10 can then be viewed on a medical image review station 34. Medical images can be printed on printer 33. Review station 34 can also receive medical images from a medical image network 31.

The technique for recording medical images, and, more particularly, x-ray cardiology angiography images is on a recordable optical compact disk. The recorded image data is compressed in two different ways: one is a lossy or irreversible compression and the other is a lossless or reversible compression. The lossy compression results in lost data. However, it should appear on a video display as nearly visually lossless. The lossless compressed digital data is compressed much less than the lossy compression and allows restoration of the image to its full original acquisitioned resolution. Lossless compression ratios are generally in the range of 1.5:1 to 4.0:1, whereas lossy compression ratios can be much higher, e.g., 6:1 and up.

Figure 2:
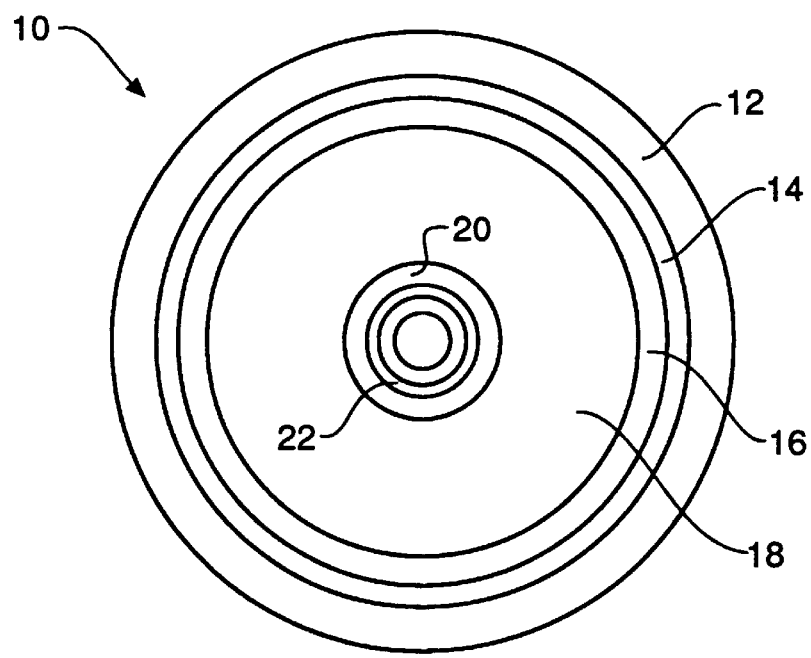
FIG. 2 is a diagrammatic view of an embodiment of record on once compact disk.

As shown in FIG. 2, the recordable optical compact disk 10 is formatted to have the following regions: a handling zone 12 (which is empty); a leadout region 14; a region 16 for storing the file directory which includes thumbnail sized images for each injection or set of images recorded on disk 10; a region 18 where losslessly compressed medical image data is stored; a region 20 where the lossy compressed medical image data is stored; and a region 22 where header information is stored. Preferably, the header information contains the appropriate information to comply with ISO 9660 formats. The ISO 9660 compliance will enable multiple computer platforms (IBM compatible PC's, Macintosh, Sun, etc.) to recognize files on the CD.

The recordable optical compact disk or CD-R is a compact disk medium that can be recorded on once, but which, once recorded on, is not erasable. The compact disk may be recorded on in unrecorded regions at different times. The medium is compact, transportable, cost effective, and reliable.

The recordable optical compact disk 10 of FIG. 2 can be used in a digital archiving and review system alternative to 35 mm cine film and associated equipment (cine cameras, processors and projectors).

Figure 3:
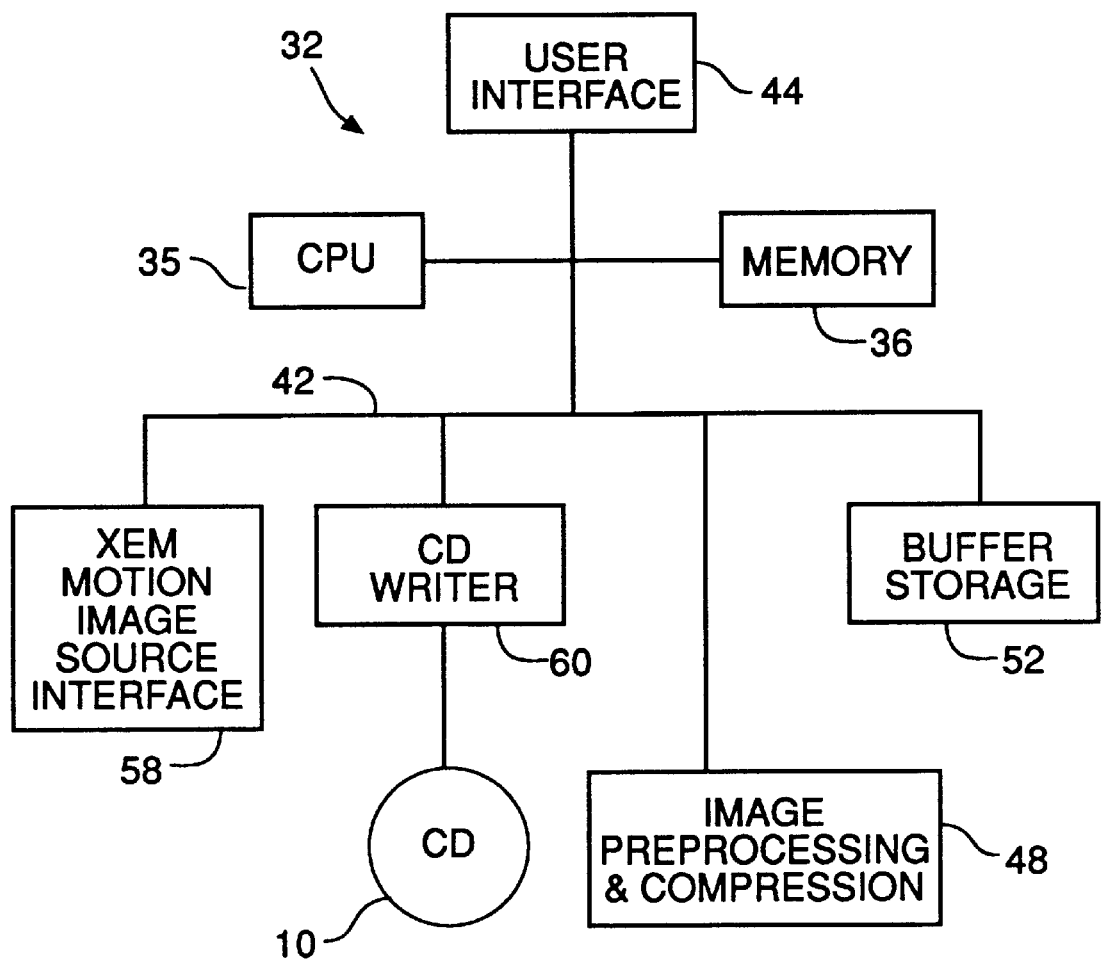
FIG. 3 is a block diagram of an archiving station of the system of FIG. 1.

Referring now to FIG. 3, there is shown a block diagram of an archive station 32 for receiving cardiology images and recording them on a recordable optical compact disk 10. As shown, archive station 32 includes, a central processing unit (CPU) 35, internal memory 36, and a user input device linked to a bus 42. Bus 42 is linked to image pre-processing and compression board 48, and a buffer storage 52. Connected to bus 42 is an XEM (X-ray equipment manufacturer) motion image source interface 58, and a CD writer 60. CD writer 60 is a recordable optical disk writer, such as supplied by the Eastman Kodak Company, Rochester, N.Y., as the Kodak PCD Writer 600. The compression board is preferably based on the Joint Photographic Experts Group (JPEG) international digital image compression standard for continuous tone still images. A general overview of this standard is presented in the article entitled "The JPEG Still Picture Compression Standard", by Gregory K. Wallace, Communication of the ACM, April 1991, volume 4, No. 4, pages 30–44. It will be understood that other compression techniques can also be used within the scope of the present invention.

The operation of archive station 32 is as follows:

In general, during the cardiac catheterization case study, the images are stored in the x-ray equipment manufacturer's (XEM's) digital acquisition memory. The entire case's data will be transferred to the archive station 32. Once data is stored in station 32, the XEM memory is free to acquire a new patient's images. The image data is received from the XEM memory by interface board 58. The image data is compressed two different ways in compression board 48: there is a lossy compression and a lossless (e.g., 2:1) compression. The lossy compression results in lost data. However, it should appear as nearly visually lossless upon display. The 2:1 compression is lossless and allows restoration of the image to its full original acquisition resolution. The lossless and lossy compressed image data is stored in buffer storage 52. The user enters the patient's name, ID number, etc. into the archive station 32 by user input device 44, if this information cannot be supplied via the XEM motion image source interface 58. This information is merged with the image data and written by CD writer 60 to the CD 10. This feature allows the elimination of preparing the lead letters and the identification x-ray exposure. Part of this information will be included in the header information written to the CD 10 as well as the file directory of the CD 10 contents.

A typical cardiology motion image source produces 30 digital images per second. Each digital image can have a format of 512×512 pixel array, or a 1024×512 pixel array, with a pixel depth of 8 bits. If a typical patient case study includes 2000 images, a single Recordable CD can be used to record the case study (assuming lossy compression of 6:1 and lossless compression of 2:1).

If the cath case exceeds the capacity of a single CD 10, the lossy compressed track will contain the images of the entire case and is identical on each CD 10. The lossless data is appropriately split between the multiple CDs 10.

Review Station

Figure 4:
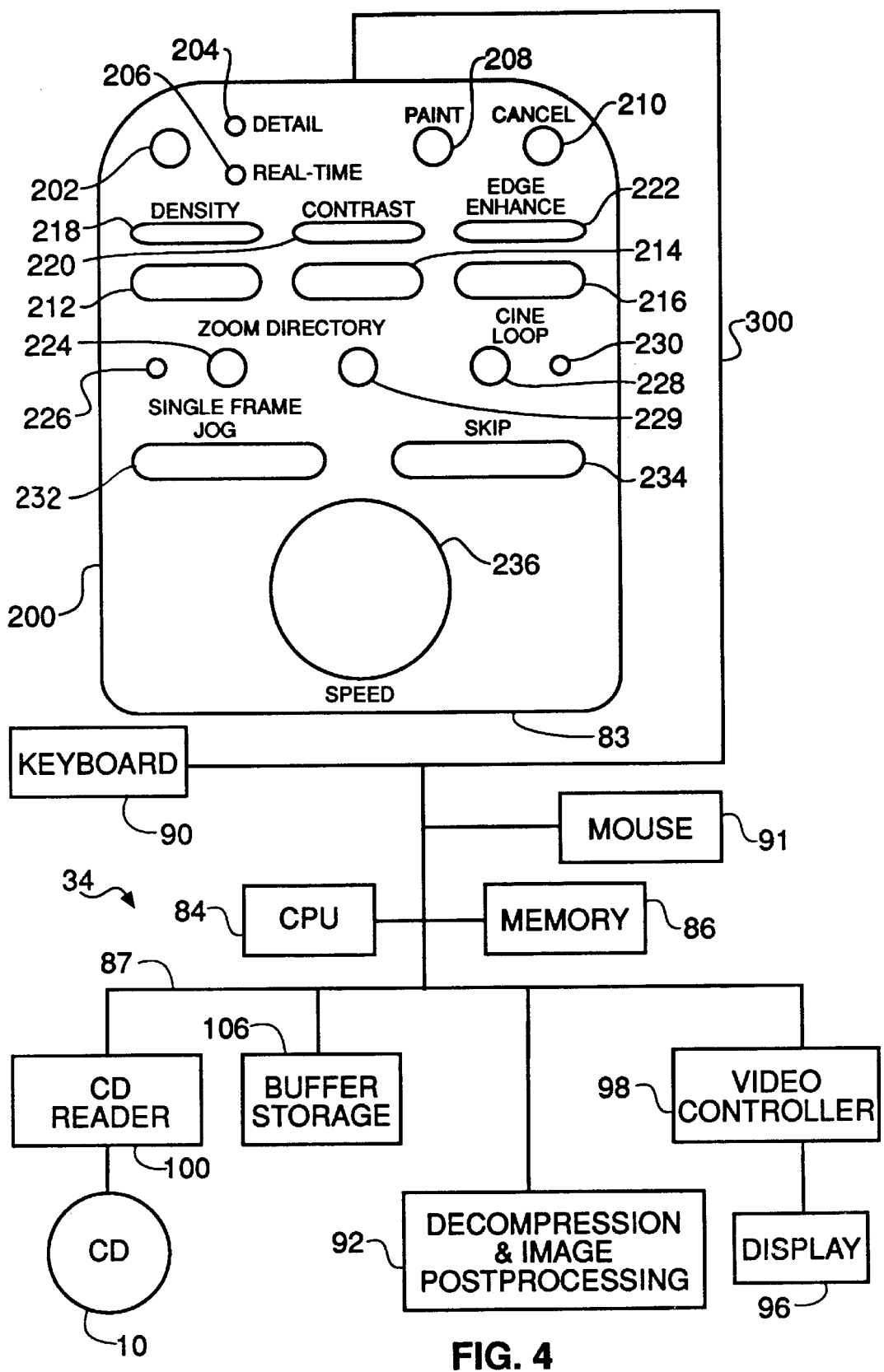
FIG. 4 is a block diagram of a review station including a remote controller according to the present invention.

A review station 34 for displaying the images of a medical image study recorded on a recordable CD 10 is shown in FIG. 4. As shown, review station 34 includes a keyboard 90, a mouse 91 for controlling display pointing functions, a controller 83, according to the present invention, a central processing unit (CPU) 84, and memory 86 connected to bus 87. Also connected to bus 87 is an image decompression and post-processing board 92, and video display 96 by way of video controller 98. It will be understood that the functions of board 92 can also be effected as a software application of CPU 84. Review station 34 includes, a CD reader 100, and buffer storage 106 connected to bus 87.

In general, review station 34 operates as follows: A CD 10 is loaded into CD reader 100. Reader 100 produces sequential images of the medical image study. The images are stored in buffer storage 106. Images which are read out of buffer storage 106 are decompressed and processed by board 92. The images are displayed on display 96 by way of video controller 98.

Once the medical image case is stored onto CD 10 by archive station 32, it is available for immediate review on review station 34 (FIG. 4). The user selects through keyboard 90 the desired CD 10 for viewing and the desired review mode. The reader 100 reads the CDs 10 data compression format to determine the appropriate image decompression factors. The file directory is read from the CD 10 into memory 86 and the review station 34 is ready to begin displaying images on display 96. The directory is displayed on display 96 as "thumbnail images" which allow the viewing of an image from each individual cath injection.

Although the higher compression image data has lost data from the original image data, its compression will produce nearly visually lossless images. Cardiologists have consistently expressed a reluctance to wait for digital image records to be transferred and loaded into memory for real-time viewing. This concern is obviated by having the lossy compressed images available for real-time viewing,(and also slow/still speeds depending upon the mode of operation) while the lossless images are available for detailed study of the images at slow or still speeds. The user can switch rapidly between any of the speeds: real-time, slow or still images.

VIEWING MODES

The user of review station 34 can select whether to review an exam in Real-time or Detail Mode. In Real-time Mode, the user views the Real-time or lossy compressed medical images at any available frame display speed. In Detail mode, the user views the Detail or losslessly compressed medical images at any available speed up to a threshold speed. The threshold speed can vary according to frame size, data type, acquisition frame rate, image source, and compression ratio.

According to the present invention, review station 34 has several functions which are controlled by means of a controller 83. These functions are as follows:

frame rate or speed, and image display direction (I. e., forward and reverse);

single frame jog which allows a user to move one frame at a time, forward or reverse;

skip forward or back by a set number of frames or by an identifiable sequence to the next study;

cine loop which allows the user to continuously loop on a sequence of frames;

zoom which allows the user to zoom on the image;

detail/real time mode which allows the user to view lossy compressed or lossless compressed medical images;

directory which allows display of thumbnail images identifying each injection or set of medical images;

still print which allows the user to send image data to an external printer 33;

cancel which allows a user to stop whatever function is occurring;

displayed image appearance characteristics allows the user to select different image appearance characteristics with visual feedback of the relative settings, such as, for example, density, contrast, edge enhancement, etc.

Other functions could also be controlled by controller 83. These functions include, control of a pointer on display 96 by a trackball or direction controls, select or enter control. Many of these functions can be performed together. Thus, when viewing images in the forward or reverse direction or when cine looping, image viewing features can be applied, such as, zoom, density, contrast and edge enhancement changes, etc.

Referring again to FIG. 4, there is shown an embodiment of controller according to the present invention. As shown, controller 83 includes a hand-holdable housing 200 having the following user actuatable controls for controlling the functions of review station 34 enumerated above.

Detail/Real-time mode control 202, with LED indicators 204,206.

Still Print control 208.

Cancel control 210.

Image appearance characteristic controls 212 for Density, 214 for Contrast, and 216 for Edge Enhancement. Bar graph displays 218, 220, and 222 are positioned close to respective controls 212, 214, 216 to indicate the value of the characteristic chosen.

Zoom control 224 with LED indicator 226.

Cine loop control 228 with LED indicator 230.

Single Frame Jog control 232.

Skip Forward/Back control 234.

Directory control 229. When pressed, the display displays all of the available (if possible) thumbnail images identifying each injection. The visual indicator on the controller is activated. When pressed again, the indicator is deactivated and the screen display reverts to normal.

Speed Knob control 236 which is rotatable in a forward or reverse direction. LED indicators may be provided around the periphery of knob control 236 to provide visual feedback of speed. Appropriate mountings and circuitry (not Shown) are provided within housing 200 for these controls and indicators to function as is known to those skilled in the art.

Controller 83 is connected to review station 34 by communication cable 300. It will be appreciated that controller 83 could also be other than hand held and can be coupled to review station 34 by wireless remote communication link.

Although the invention has been described specifically in relation to the archive and review of cardiology images produced during a catheterization study of a patient by angiography x-ray imaging, it will be understood that the present invention includes the recording of other types of medical images in both lossy compressed and losslessly compressed image data on a record once optical compact disk. Thus, the medical images can be received from any number of diagnostic imaging modalities (such as, MRI, US, CT, PET, NM, etc.); digital radiography (such as storage phosphor systems); still and cine radiographic film digitizers; and the like. It will also be understood that image compression techniques other than JPEG can be used to produce the lossy and lossless compressed image data recorded on the record once optical compact disk.

What is claimed is:

1. In a medical image review station which includes a display, a means for storing a sequence of medical images, and a computer for controlling the processing and display of images from said means for storing on said display according to user selectable functions, apparatus comprising;

a hand-held remote controller coupled to said review station including the following user actuatable controls;

at least a first variable appearance control for controlling a first appearance characteristic of a displayed image;

a first visual indicator associated with and located close to said first appearance control for indicating the relative value over a range of values of the selected image appearance characteristic;

a rotary control for controlling the speed and direction of movement of images displayed on said display; and a plurality of LED indicators provided around the periphery of said rotary control to provide visual feedback of speed and direction of movement.

2. The apparatus of claim 1 wherein said first appearance characteristic controlled by said first appearance control is density, contrast, or edge enhancement.

3. The apparatus of claim 1 wherein said hand held remote controller includes second and third variable appearance controls for controlling respective second and third appearance characteristics of said displayed image, and further includes second and third visual indicators respectively associated with and located close to said second and third appearance controls for indicating the respective relative value over a range of values of the selected values.

4. The apparatus of claim 3 wherein said first, second and third appearance characteristics are respectively, density, contrast and edge enhancement.

5. The apparatus of claim 1 including a still frame printer coupled to said review station and wherein said controller includes a still print control for controlling said printer to make a print of a medical image displayed by said review station.

6. The apparatus of claim 1 wherein said controller includes a cancel control for canceling any function that is occurring.

7. The apparatus of claim 1 wherein said controller includes a zoom control which controls zoom on an image.

8. The apparatus of claim 1 wherein said controller includes a single frame jog control which controls the movement of one frame at a time in forward or reverse.

9. The apparatus of claim 1 wherein said controller includes a skip forward or back control which controls skipping forward or back by a set number of frames or an identifiable sequence.

10. The apparatus of claim 1 wherein said controller includes a cine loop control which controls the display of a continuous loop of a sequence of frames.

11. The apparatus of claim 1 wherein said controller includes a directory control to control a selection of a sequence of images to be displayed.

12. The apparatus of claim 1 wherein said controller includes an image control for selecting whether losslessly compressed or lossy compressed images are displayed on said display where said medical image review station stores a set of medical images in both losslessly compressed and lossy compressed formats.

\* \* \* \* \*